(12) United States Patent
Huang et al.

(10) Patent No.: US 11,573,645 B1
(45) Date of Patent: Feb. 7, 2023

(54) TOUCHPAD MODULE OF AN INFORMATION HANDLING SYSTEM

(71) Applicant: Dell Products L.P., Round Rock, TX (US)

(72) Inventors: Yu-Feng Huang, Hsin-Chu (TW); Chun-Kai Tzeng, Keelung (TW); Chin-Chung Wu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/654,464

(22) Filed: Mar. 11, 2022

(51) Int. Cl.
*G06F 3/02* (2006.01)

(52) U.S. Cl.
CPC .................................. *G06F 3/0202* (2013.01)

(58) Field of Classification Search
CPC ...................................................... G06F 3/0202
USPC .......................................................... 345/184
See application file for complete search history.

(56) References Cited

U.S. PATENT DOCUMENTS

| | | | |
|---|---|---|---|
| 10,824,252 B1* | 11/2020 | Huang | H05K 1/181 |
| 2009/0072749 A1* | 3/2009 | Saldana | G02B 23/12 |
| | | | 315/158 |
| 2015/0169005 A1* | 6/2015 | Yanagida | G06F 1/1643 |
| | | | 345/173 |
| 2021/0011565 A1* | 1/2021 | Pai | G06F 3/03547 |

* cited by examiner

*Primary Examiner* — Mark Edwards
(74) *Attorney, Agent, or Firm* — McDermott Will & Emery LLP

(57) ABSTRACT

A touchpad module including: a touchpad printed circuit board (PCB); a switch coupled to a first side of the touchpad PCB; a touchpad bracket, with at least a portion of the bracket spaced apart from the switch a first distance; a frame, with at least a segment of the frame positioned between the portion of the bracket and the switch, the segment of the frame including a through hole in superimposition with at least a portion of the switch; and a stopper positioned within the through hole and with a first end of the stopper in contact with the switch.

14 Claims, 16 Drawing Sheets

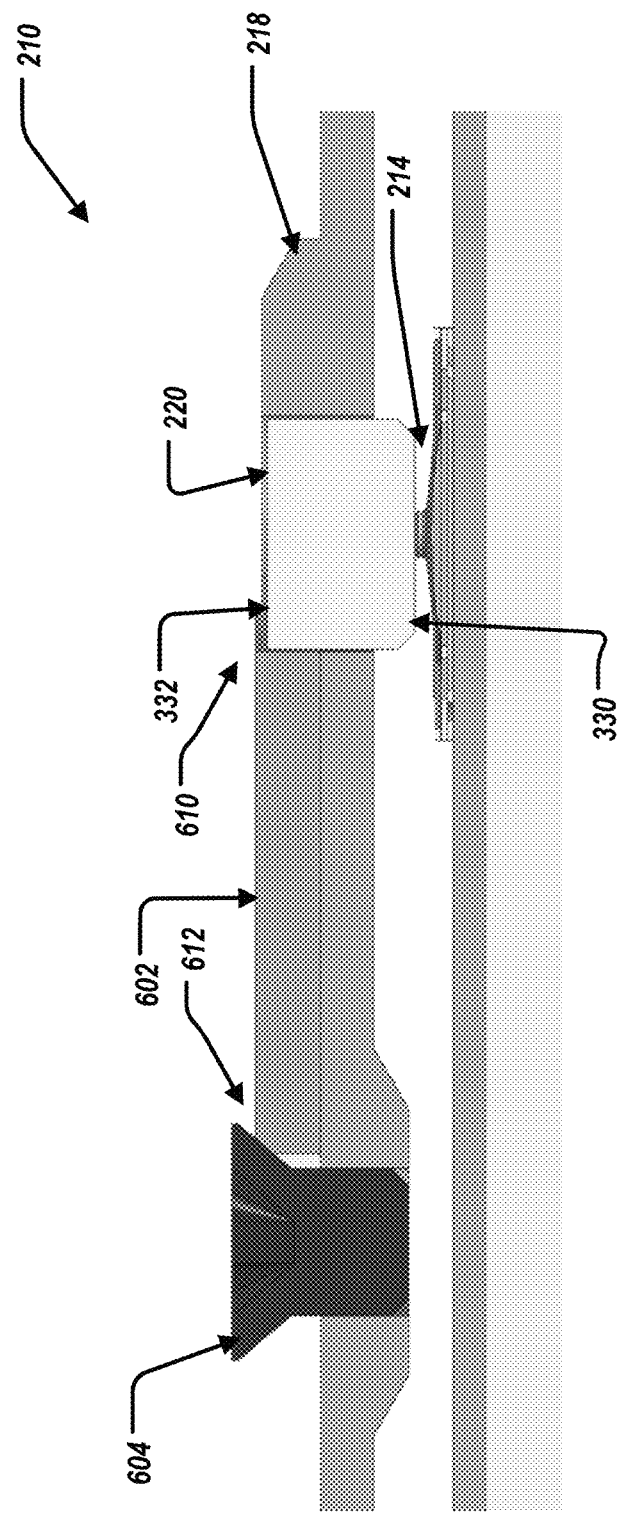

TOUCHPAD MODULE OF AN INFORMATION HANDLING SYSTEM

BACKGROUND

Field of the Disclosure

The disclosure relates generally to an information handling system, and in particular, a touchpad module of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Undesired free gap between a touchpad switch and underneath stopper plane can cause rattling issues of the touchpad. Such undesired free gap can result from dimension tolerance deviation, parts deformation by initial molding, heat during manufacturing process, and/or stress released from lamination bonding process.

SUMMARY

Innovative aspects of the subject matter described in this specification may be embodied in a touchpad module including a touchpad printed circuit board (PCB); a switch coupled to a first side of the touchpad PCB; a touchpad bracket, with at least a portion of the bracket spaced apart from the switch a first distance; a frame, with at least a segment of the frame positioned between the portion of the bracket and the switch, the segment of the frame including a through hole in superimposition with at least a portion of the switch; and a stopper positioned within the through hole and with a first end of the stopper in contact with the switch.

Other embodiments of these aspects include corresponding systems, apparatus, and computer programs, configured to perform the actions of the methods, encoded on computer storage devices.

These and other embodiments may each optionally include one or more of the following features. For instance, the stopper is positioned within the through hole and with the first end of the stopper in contact with the switch such that there is a zero-gap between the switch and the first end of the stopper. Touchpad layer coupled to a second side of the touchpad PCB, the second side of the touchpad PCB opposite to the first side of the touchpad PCB. An epoxy layer positioned within the through hole and adjacent to a second end of the stopper, the second end of the stopper opposite to the first end of the stopper, wherein the epoxy layer maintains a positioning of the stopper within the through hole to be in contact with the switch. The stopper is comprised of a magnetic material, the touchpad module further comprising a magnetic member, wherein the magnetic member maintains a position of the stopper within the through hole to be in contact with the switch. A spring member, the spring member applying a force to a second end of the stopper, the second end of the stopper opposite to the first end of the stopper, wherein the spring maintains a position of the stopper within the through hole to be in contact with the switch. A wedge block; and a wedge screw, wherein a first end of the wedge block is coupled to the stopper at a second end of the stopper opposite to the first end of the stopper, wherein the wedge screw is coupled to the frame and a second end of the wedge block to maintain a positioning of the wedge block with respect to the stopper, the second end of the wedge block opposite to the first end of the wedge block.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 6A-6C illustrate the touchpad module, in a third implementation.

DESCRIPTION OF PARTICULAR EMBODIMENT(S)

Figure 1:
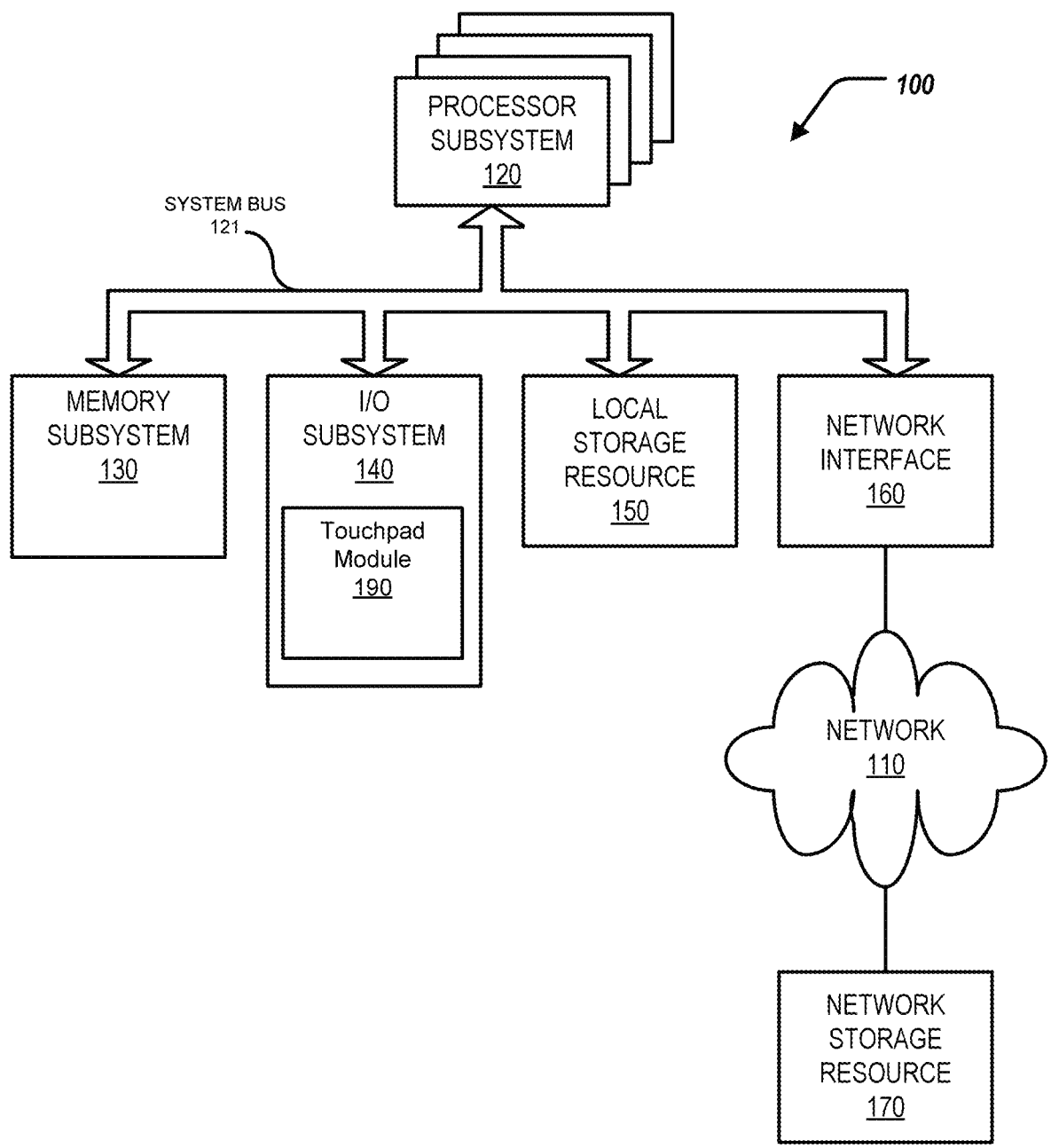
FIG. 1 is a block diagram of selected elements of an embodiment of an information handling system.

This disclosure discusses a touchpad module of an information handling system. A touchpad module can include a stopper and a switch. A "zero-gap" between the stopper and the switch is desired.

Specifically, this disclosure a touchpad module including a touchpad printed circuit board (PCB); a switch coupled to a first side of the touchpad PCB; a touchpad bracket, with at least a portion of the bracket spaced apart from the switch a first distance; a frame, with at least a segment of the frame positioned between the portion of the bracket and the switch, the segment of the frame including a through hole in superimposition with at least a portion of the switch; and a stopper positioned within the through hole and with a first end of the stopper in contact with the switch.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

The I/O subsystem 140 can further include a touchpad module 190.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In short, the touchpad module 190 can include a stopper and a switch. A "zero-gap" between the stopper and the switch is desired.

Figure 2:
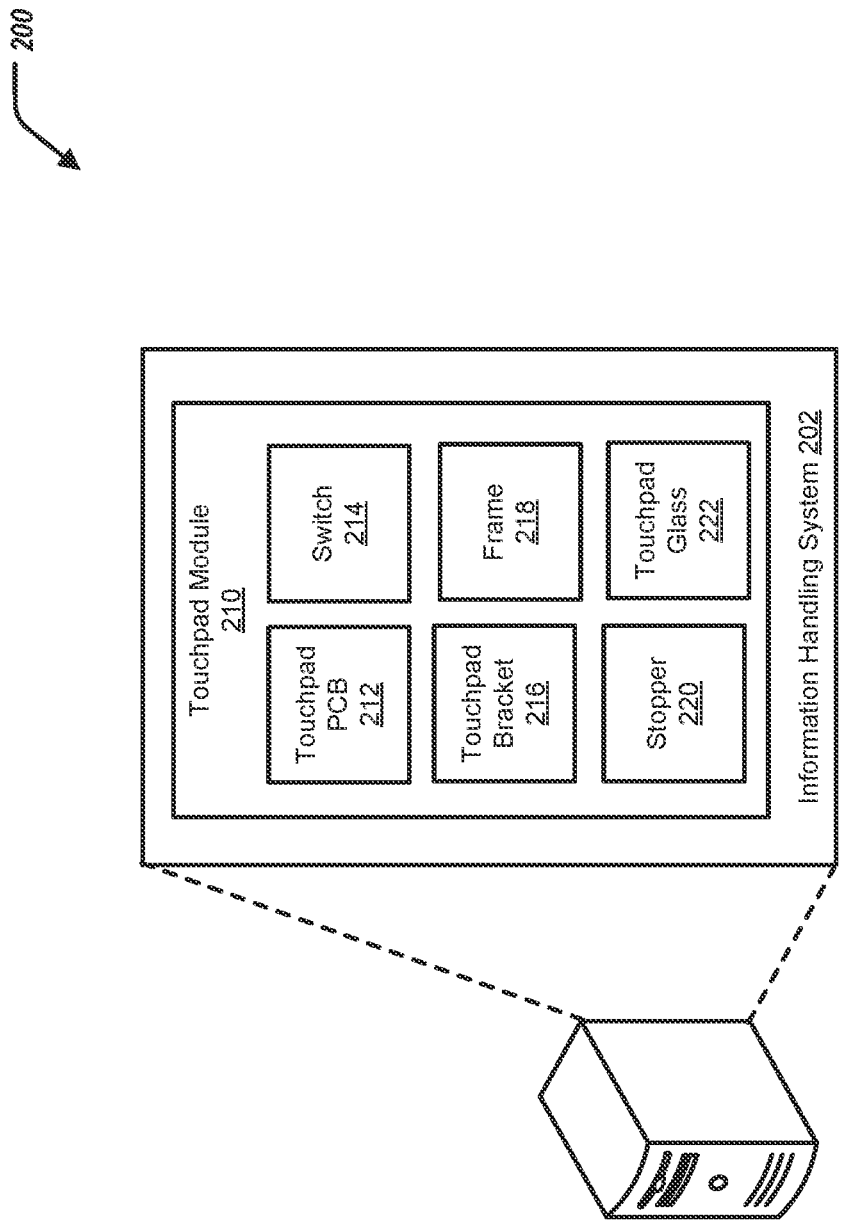
FIG. 2 illustrates a block diagram of an information handling system including a touchpad module.

Turning to FIG. 2, FIG. 2 illustrates an environment 200 including an information handling system 202. The information handling system 202 can include a touchpad module 210. In some examples, the information handling system 202 is similar to, or includes, the information handling system 100 of FIG. 1. In some examples, the touchpad module 210 is the same, or substantially the same, as the touchpad module 190 of FIG. 1.

The touchpad module 210 can include a touchpad printed circuit board (PCB) 212, a switch 214, a touchpad bracket 216, a frame 218, a stopper 220, and a touchpad layer 222 (such as glass, or mylar).

Figure 3:
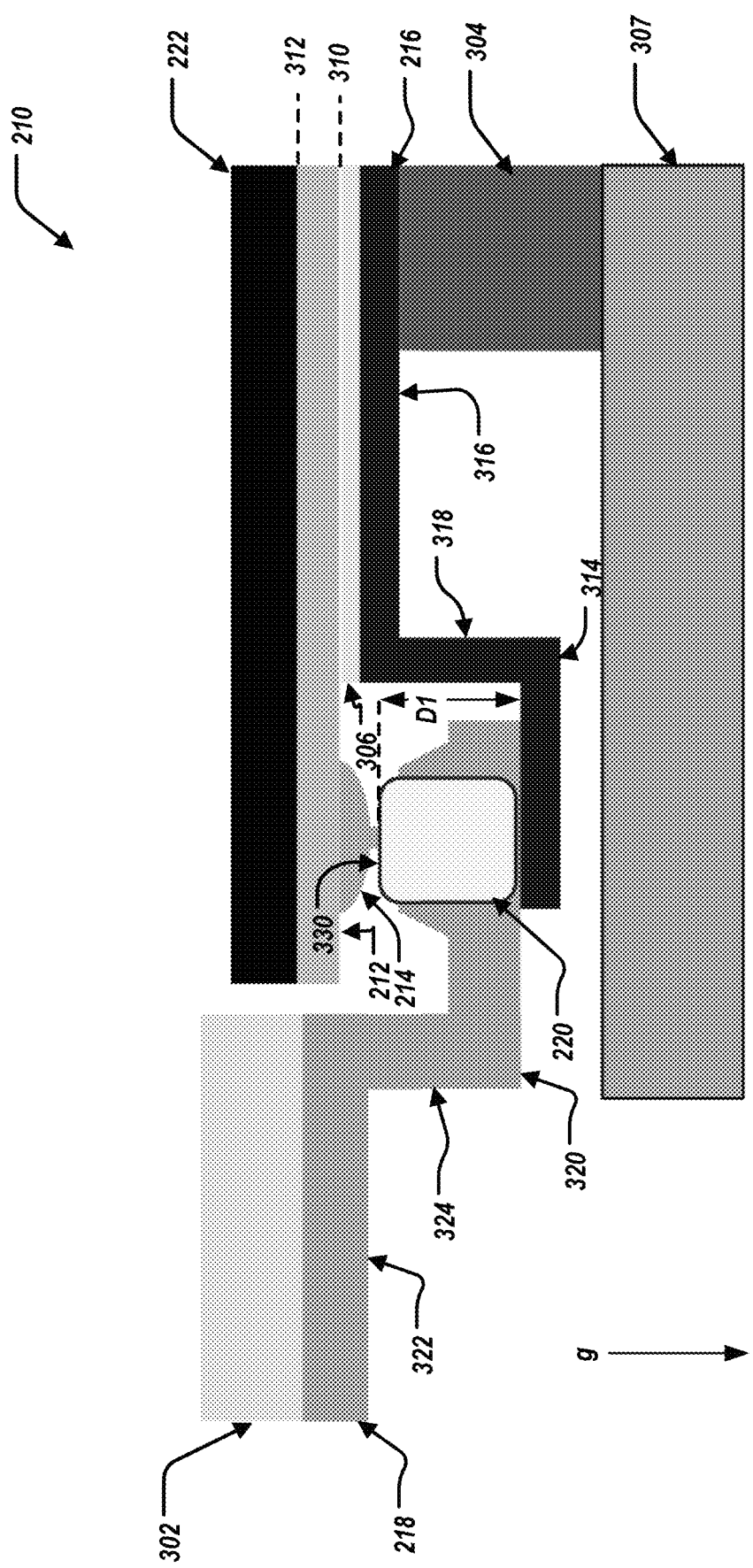
FIG. 3 illustrates a block diagram of the touchpad module.

FIG. 3 illustrates a block diagram of the touchpad module 210. The touchpad module 210 can include the touchpad PCB 212, the switch 214, the touchpad bracket 216, the frame 218, the stopper 220, and the touchpad layer 222. The touchpad module 210 can further include a palm rest 302, a flexible member 304 (e.g., a spongy material), and an adhesive layer 306. In some cases, the touchpad module 210 can be positioned proximate to a battery 307.

In some cases, the touchpad module 210 can be any type of module that includes a switch 214 where tactile functionality are sensitive to clearance of the switch 214, e.g., a power button module. The touchpad module 210 can include any type of mechanical switch.

The touchpad PCB 212 can include a first side 310 and a second side 312. The first side 310 can be positioned opposite to the second side 312. The switch 214 is coupled to the first side 310 of the touchpad PCB 212. The touchpad layer 222 is coupled to the second side 312 of the touchpad PCB 212.

The switch 214 when engaged, or activated, can provide signals to the touchpad PCB 212 and other computing components of the information handling system 202 indicating user-input to the information handling system 202 (e.g., a "click" or selection).

The touchpad bracket 216 can include a first portion 314 and a second portion 316 connected together by a third portion 318. The first portion 314 of the bracket 216 can be spaced apart from the switch 214 a first distance D1. The bracket 216, and in particular, the second portion 316, can be coupled to the first side 310 of the touchpad PCB 212 by the adhesive layer 306.

The frame 218 can include a first segment 320 and a second segment 322 connected together by a third segment 324. The first segment 320 of the frame 218 can be positioned between the first portion 314 of the bracket 216 and the switch 214. The first segment 320 of the frame 218 can include a through hole 402, shown in FIGS. 4A and 4B. The through hole 402 is in superimposition with the at least a portion of the switch 214.

Figure 4A:
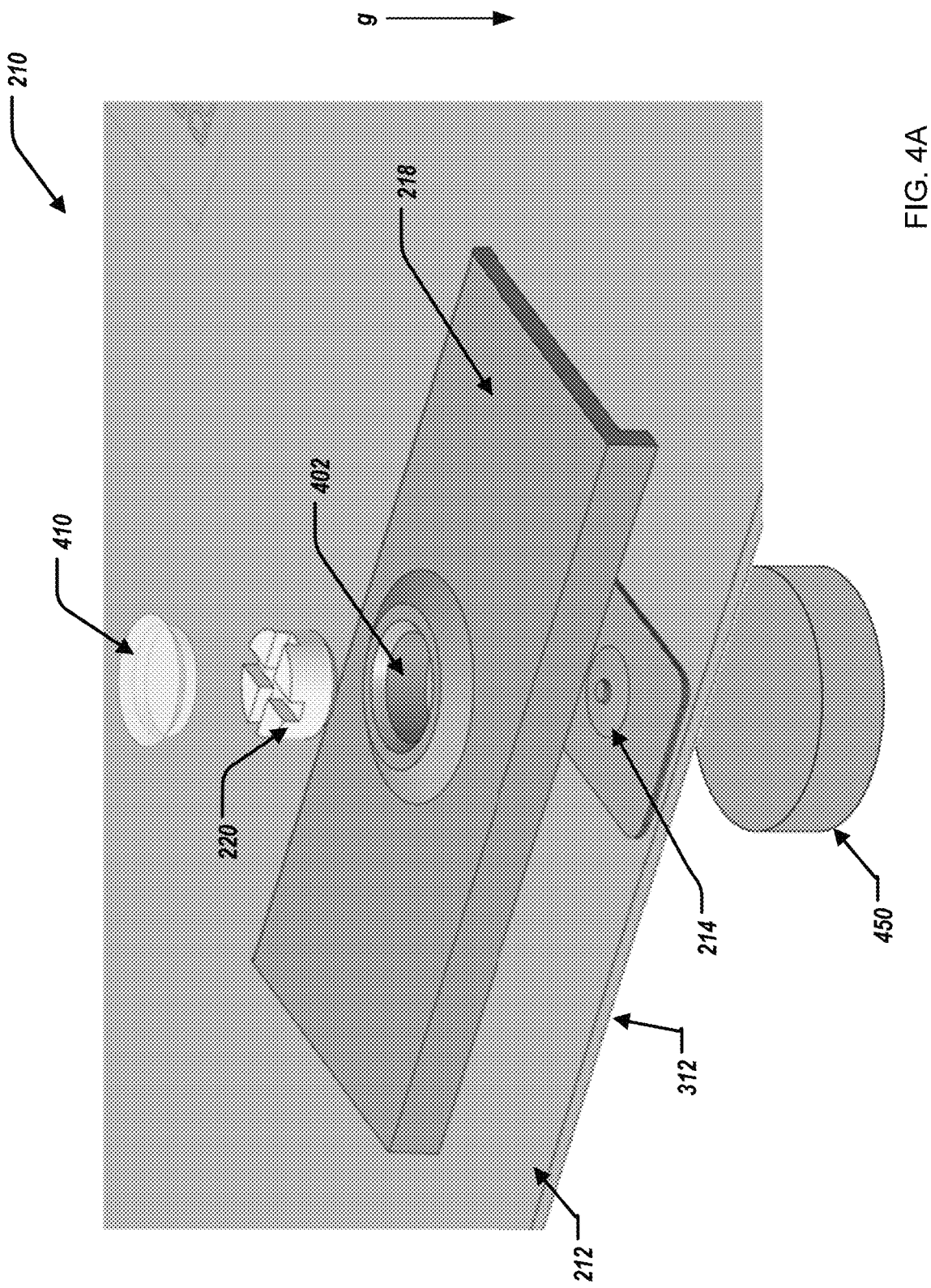
FIGS. 4A-4D illustrate the touchpad module, in a first implementation.
Figure 4B:
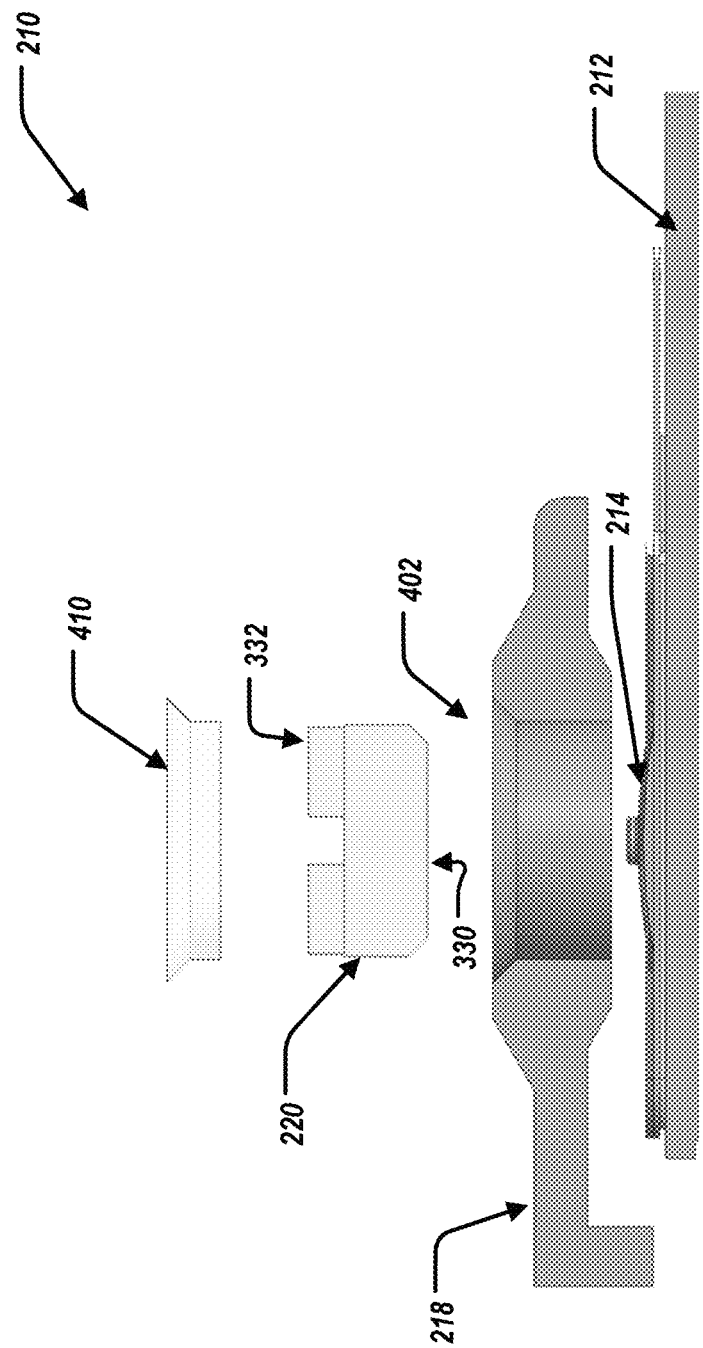

The stopper 220 is positioned within the through hole 402, shown FIGS. 4A and 4B. A first end 330 of the stopper 220 is in contact with the switch 214. Specifically, the stopper 220 is positioned within the through hole 402, shown FIGS. 4A and 4B, with the first end 330 of the stopper 220 in contact with the switch 214 such that there is a zero-gap between the switch 214 and the first end 330 of the stopper 220.

Figure 4C:
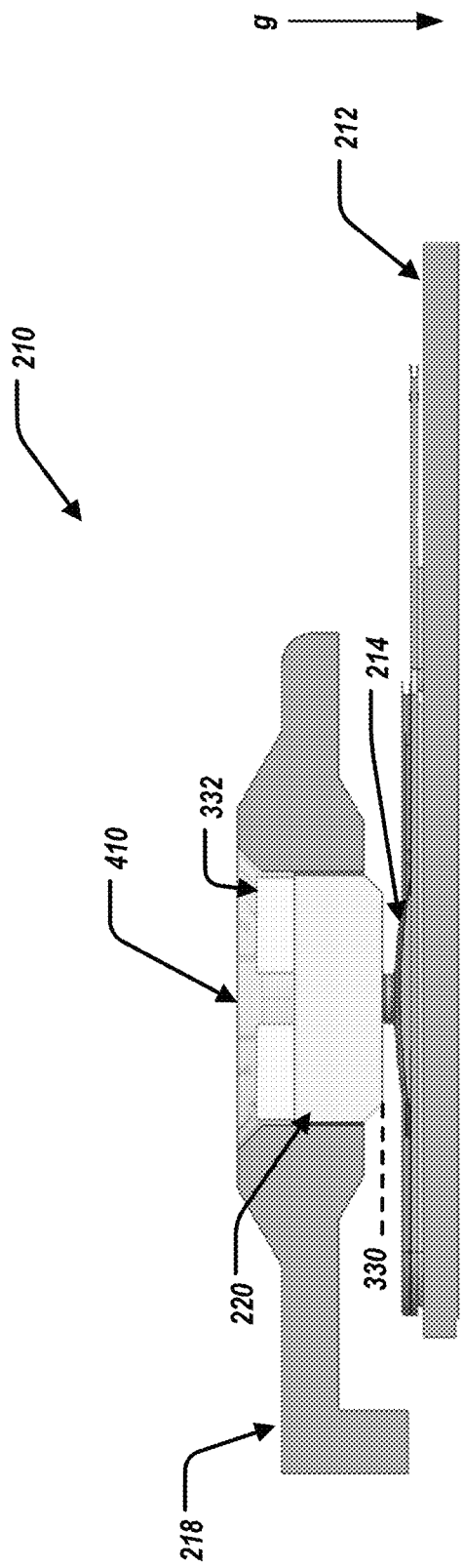

FIG. 4A illustrates a perspective exploded view of the touchpad module 210; and FIG. 4B illustrates a side cutaway view exploded view of the touchpad module 210. Specifically, the stopper 220 can be inserted into the through hole 402 of the frame 218 with the first end 330 of the stopper 220 in contact with the switch 214 such that there is a zero-gap between the switch 214 and the first end 330 of the stopper 220, as shown in FIG. 4C. For example, the stopper 220 can be positioned within the through hole 402 with the first end 330 of the stopper 220 in contact with the switch 214 through gravity (shown in general along the direction g) such that there is a zero-gap between the switch 214 and the first end 330 of the stopper 220

Figure 4D:
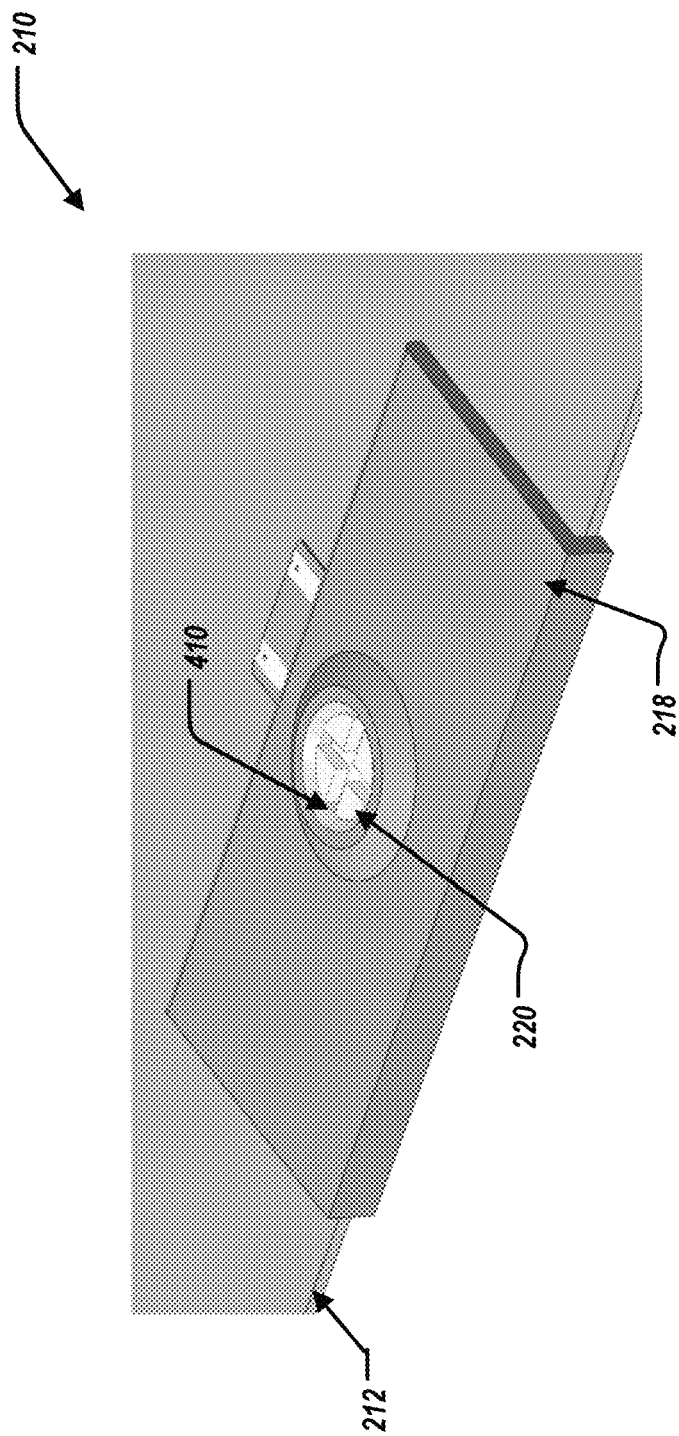

Moreover, the touchpad module 210 can further include an epoxy layer 410. The epoxy layer 410 can be positioned within the through hole 402 and adjacent to a second end 332 of the stopper 220, as shown in FIG. 4C. The epoxy layer 410 can facilitate maintaining a positioning of the stopper 220 within the through hole 402 and further, the positioning of the stopper 220 within the through hole 402 to be in contact with the switch 214. Specifically, the stopper 220 is positioned within the through hole 402 such that the first end 330 of the stopper 220 is in contact with the switch 214. The epoxy layer 410 can then be positioned within the through hole 402, contacting the second side 332 of the stopper 220, to maintain or "fix" the positioning of the stopper 220 within the through hole 402, and in particular, in contact with the switch 214, as shown in FIGS. 4C and 4D. An ultraviolet (UV) light can be applied to the epoxy layer 410 to cure the epoxy layer 410 to maintain or "fix" the positioning of the stopper 220 within the through hole 402, and in particular, in contact with the switch 214. For example, when the touchpad module 210 is installed within the information handling system 202, the stopper 220 can succumb to gravitational forces, shown as direction g in FIG. 3. That is, the stopper 220 can potentially translate along the direction g (gravity) when the touchpad 210 is installed within the information handling system 202 in the configuration/positioning as shown in FIG. 3. To counter such potential translation, the epoxy layer 410 can maintain or "fix" the positioning of the stopper 220 within the through hole 402 against such gravitational forces, and further, maintain the positioning of the stopper 220 within the through hole 402 to be in contact with the switch 214.

Referring back to FIG. 4A, the touchpad module 210 can further include a magnetic member 450. The magnetic member 450 can be positioned opposite to the stopper 220. That is, the magnetic member 450 can be positioned adjacent to the second side 312 of the touchpad PCB 212. Furthermore, the stopper 220 can be comprised of a magnetic material. To that end, the magnetic member 450 can provide magnetic attraction to the stopper 220 to facilitate maintaining a positioning of the stopper 220 within the through hole 402 and further, the positioning of the stopper 220 within the through hole 402 to be in contact with the switch 214. For example, when the touchpad module 210 is installed within the information handling system 202, the stopper 220 can succumb to gravitational forces, shown as direction g in FIG. 3. That is, the stopper 220 can potentially translate along the direction g (gravity) when the touchpad 210 is installed within the information handling system 202 in the configuration/positioning as shown in FIG. 3. To counter such potential translation, the magnetic member 450 can provide magnetic attraction to the stopper 220 against such gravitational forces, facilitating maintaining a positioning of the stopper 220 within the through hole 402 and further, the positioning of the stopper 220 within the through hole 402 to be in contact with the switch 214.

Figure 5A:
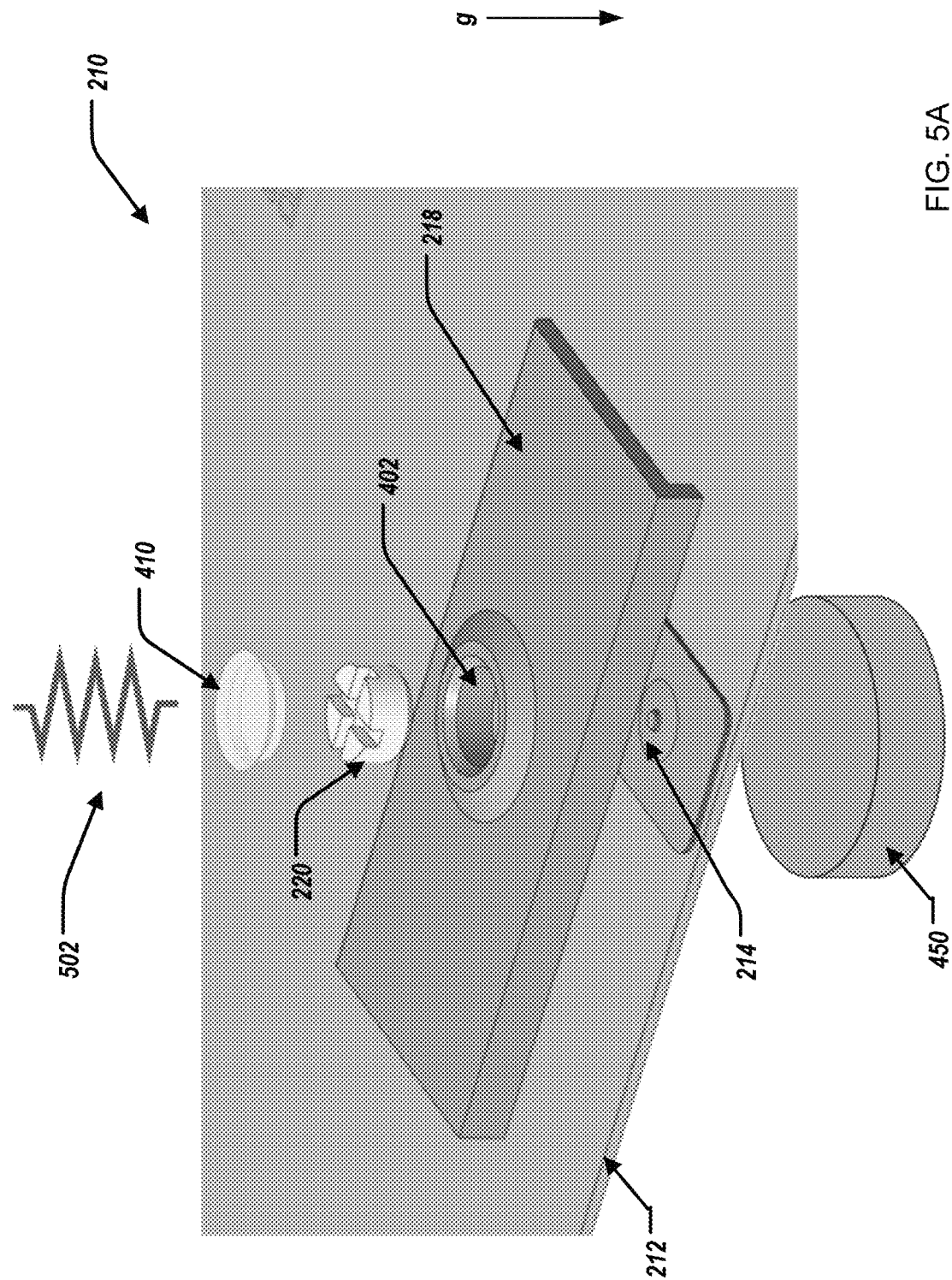
FIGS. 5A-5B illustrate the touchpad module, in a second implementation.
Figure 5B:
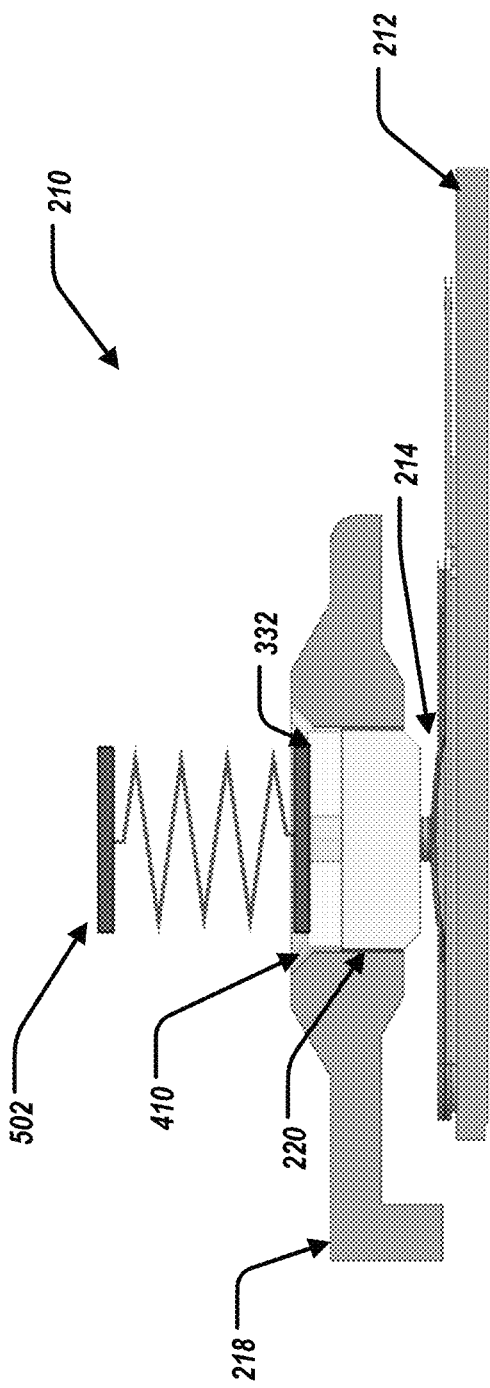

FIG. 5A illustrates a perspective exploded view of the touchpad module 210, in a further implementation. Specifically, the touchpad module 210 can further includes a spring member 502. The spring member 502 can be positioned adjacent to the second end 332 of the stopper 220, as shown in FIG. 5B. Further, the spring member 502 can be positioned between the stopper 220 and the first portion 314 of the bracket 216. The spring member 502 can maintain or "fix" the positioning of the stopper 220 within the through hole 402, and in particular, in contact with the switch 214, as shown in FIG. 5B. For example, when the touchpad module 210 is installed within the information handling system 202, the stopper 220 can succumb to gravitational forces, shown as direction g in FIG. 3. That is, the stopper 220 can potentially translate along the direction g (gravity) when the touchpad 210 is installed within the information handling system 202 in the configuration/positioning as shown in FIG. 3. To counter such potential translation, the spring member 502 can provide a force to the stopper 220 against such gravitational forces, facilitating maintaining a positioning of the stopper 220 within the through hole 402 against such gravitational forces, and further, maintain the positioning of the stopper 220 within the through hole 402 to be in contact with the switch 214.

In some examples, the touchpad module 210 can include any combination of the epoxy layer 410, the magnetic member 450, and the spring member 502 to facilitate maintaining a positioning of the stopper 220 within the through hole 402 against such gravitational forces, and further, maintain the positioning of the stopper 220 within the through hole 402 to be in contact with the switch 214.

Figure 6A:
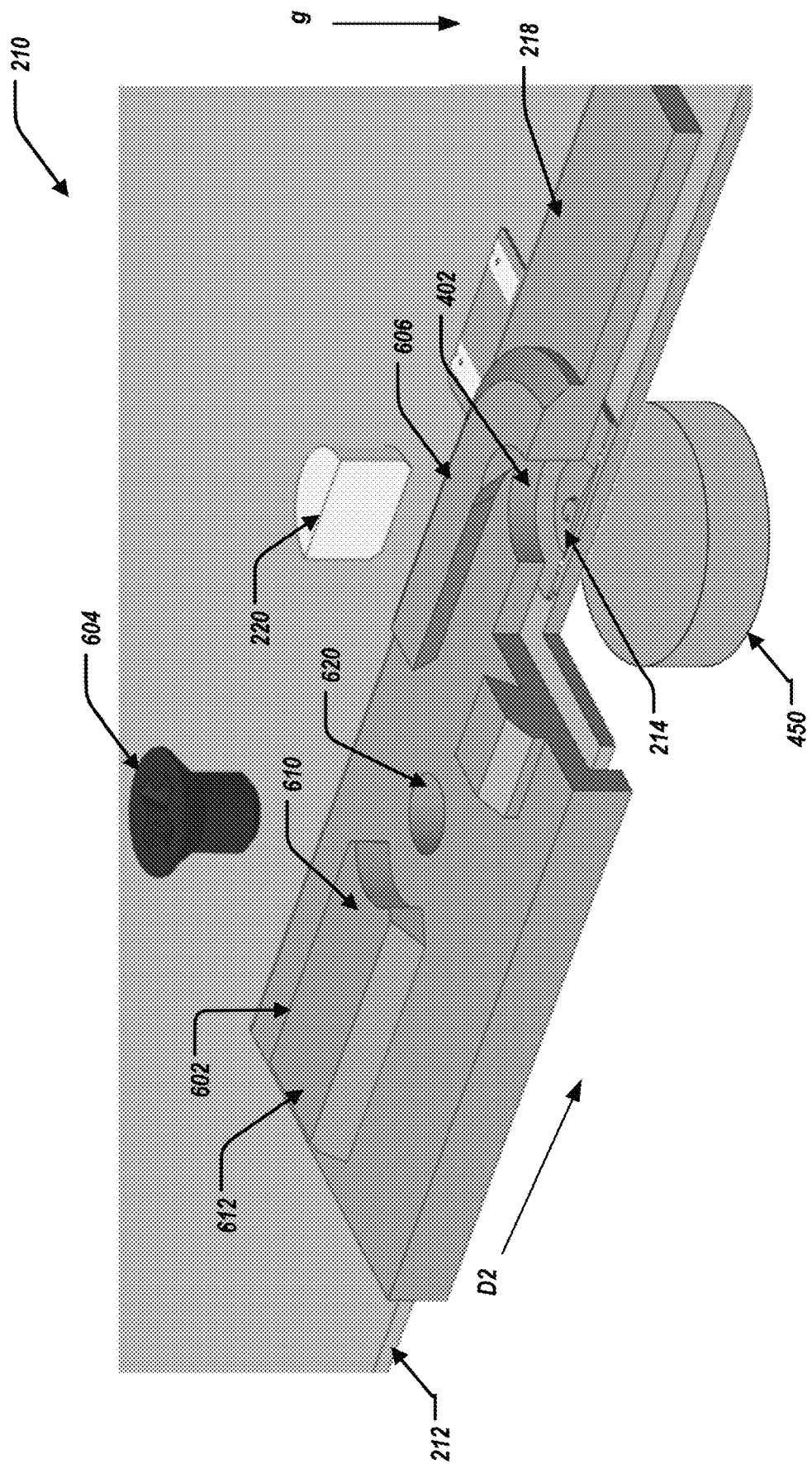

FIG. 6A illustrates a perspective exploded cut-away view of the touchpad module 210, in a further implementation. Specifically, the touchpad module 210 can further include a wedge block 602 and a wedge screw 604. The frame 218 can further include a guide 606. To that end, the wedge block 602, the wedge screw 604, and the guide 606 can facilitate maintaining a positioning of the stopper 220 within the through hole 402 and further, the positioning of the stopper 220 within the through hole 402 to be in contact with the switch 220. Specifically, the stopper 220 is positioned within the through hole 402. The first end 330 of the stopper 220 is in contact with the switch 214, as shown in FIG. 6B. Specifically, the stopper 220 is positioned within the through hole 402, with the first end 330 of the stopper 220 in contact with the switch 212 such that there is a zero-gap between the switch 214 and the first end 330 of the stopper 220.

The wedge block 602 can be translated along the direction D2 and within the guide 606 such that a first end 610 of the wedge block 602 contacts and is coupled to the stopper 220 at the second end 332 of the stopper 220, as shown in FIG. 6B. After translation of the wedge block 602 such that the first end 610 of the wedge block 602 contacts and is coupled to the stopper 220 at the second end 332 of the stopper 220, the wedge screw 604 can be positioned within a screw hole 620, coupling the wedge screw 604 to the frame 218. Furthermore, the wedge screw 604 can be coupled to a second end 612 of the wedge block 602 as shown in FIGS. 6B and 6C, with the second end 612 of the wedge block 602 being opposite the first end 610.

The wedge block 602, when coupled to the stopper 220, and the wedge screw 604, when coupled to the wedge block 602, can facilitate maintaining a positioning of the stopper 220 within the through hole 402 and further, the positioning of the stopper 220 within the through hole 402 to be in contact with the switch 214. Specifically, the stopper 220 is positioned within the through hole 402 such that the first end 330 of the stopper 220 is in contact with the switch 214. That is, the wedge block 602, when coupled to the stopper 220, and the wedge screw 604, when coupled to the wedge block 602, can apply a force to the stopper 220 to maintain a positioning of the stopper 220 within the through hole 402 and further, the positioning of the stopper 220 within the through hole 402 to be in contact with the switch 214. For example, when the touchpad module 210 is installed within the information handling system 202, the stopper 220 can succumb to gravitational forces, shown as direction g in FIG. 3. That is, the stopper 220 can potentially translate along the direction g (gravity) when the touchpad 210 is installed within the information handling system 202 in the configuration/positioning as shown in FIG. 3. To counter such potential translation, the wedge block 602, when coupled to the stopper 220, and the wedge screw 604, when coupled to the wedge block 602 can provide a force to the stopper 220 against such gravitational forces, facilitating maintaining a positioning of the stopper 220 within the through hole 402 against such gravitational forces, and further, maintain the positioning of the stopper 220 within the through hole 402 to be in contact with the switch 214.

Figure 6C:
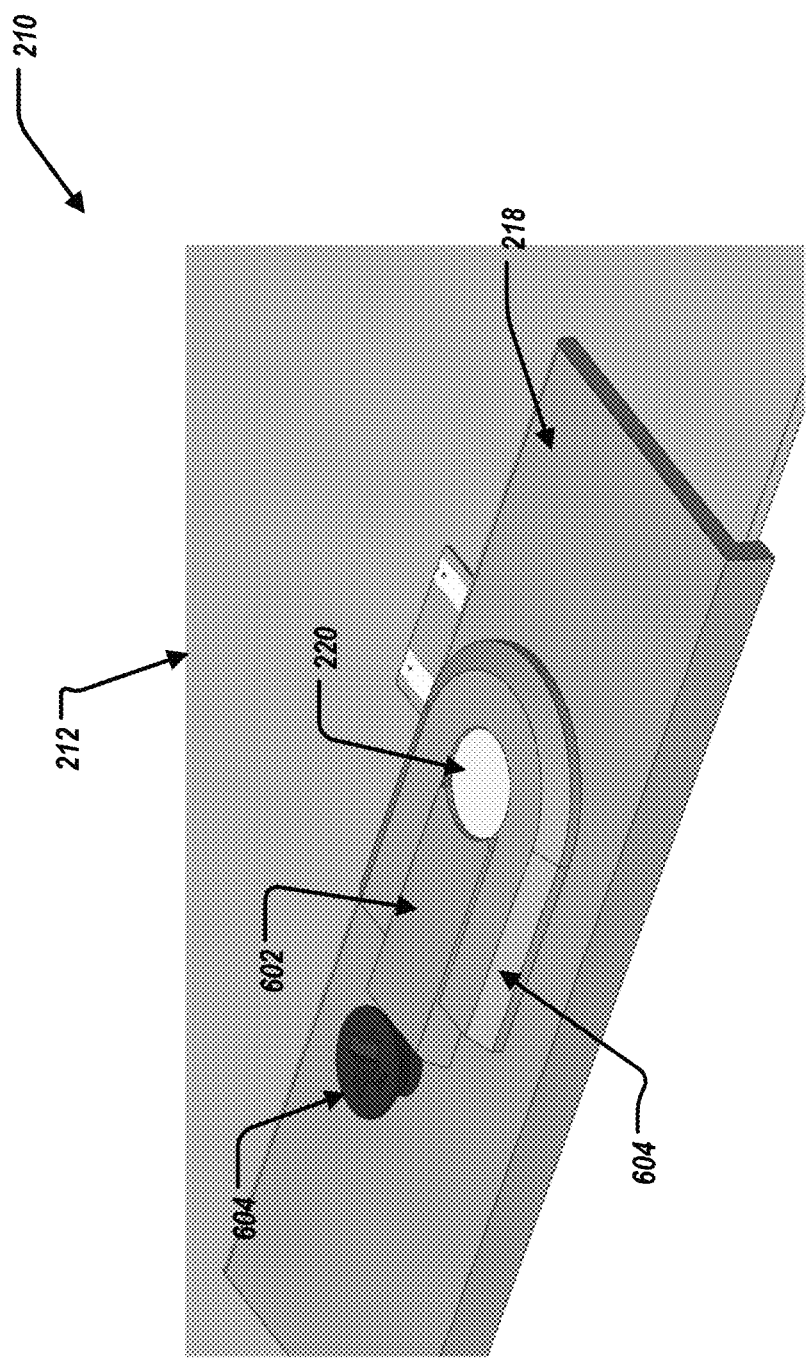
Figure 8A:
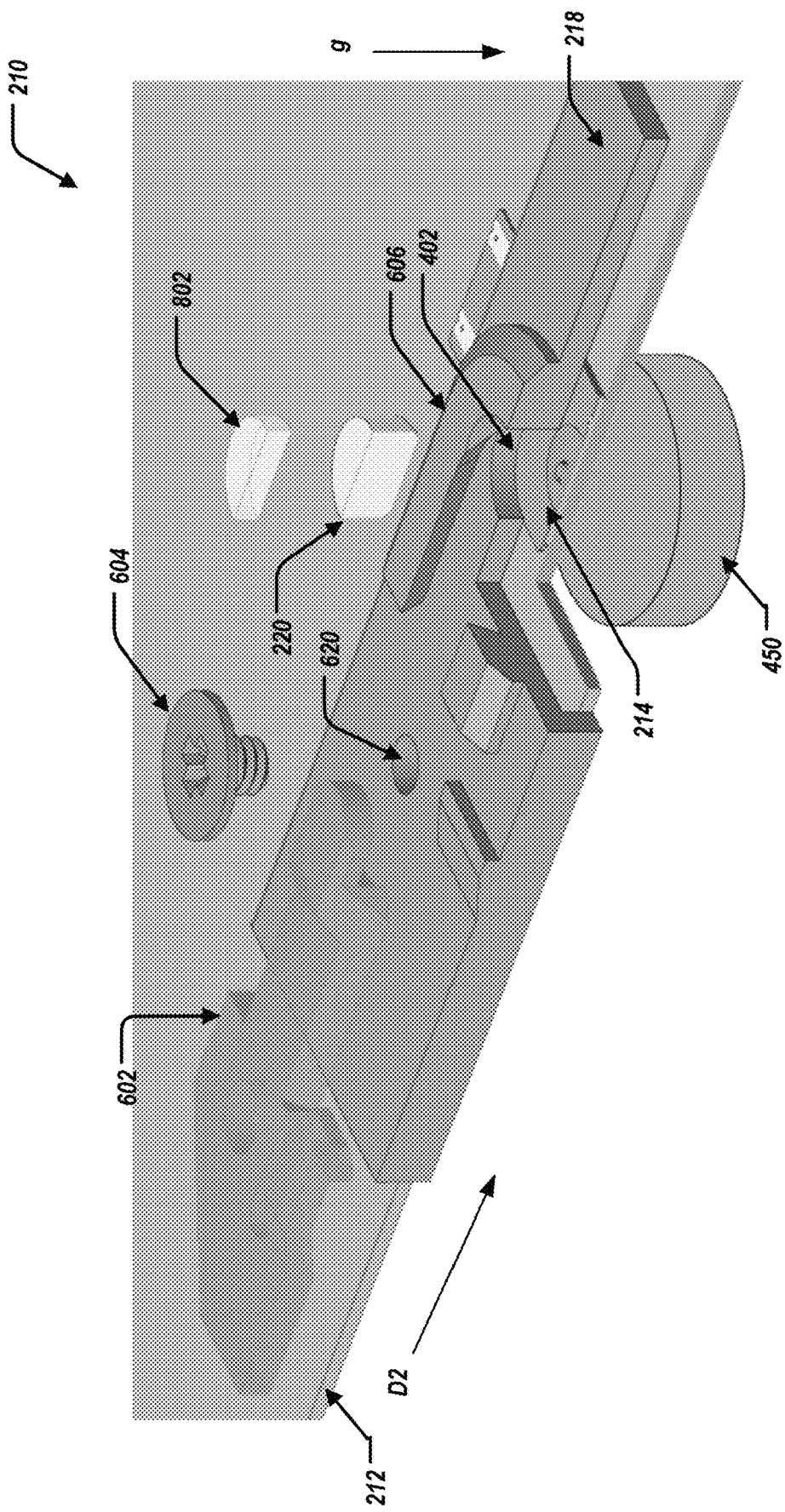
FIGS. 8A-8C illustrate the touchpad module, in a fourth implementation.
Figure 8B:
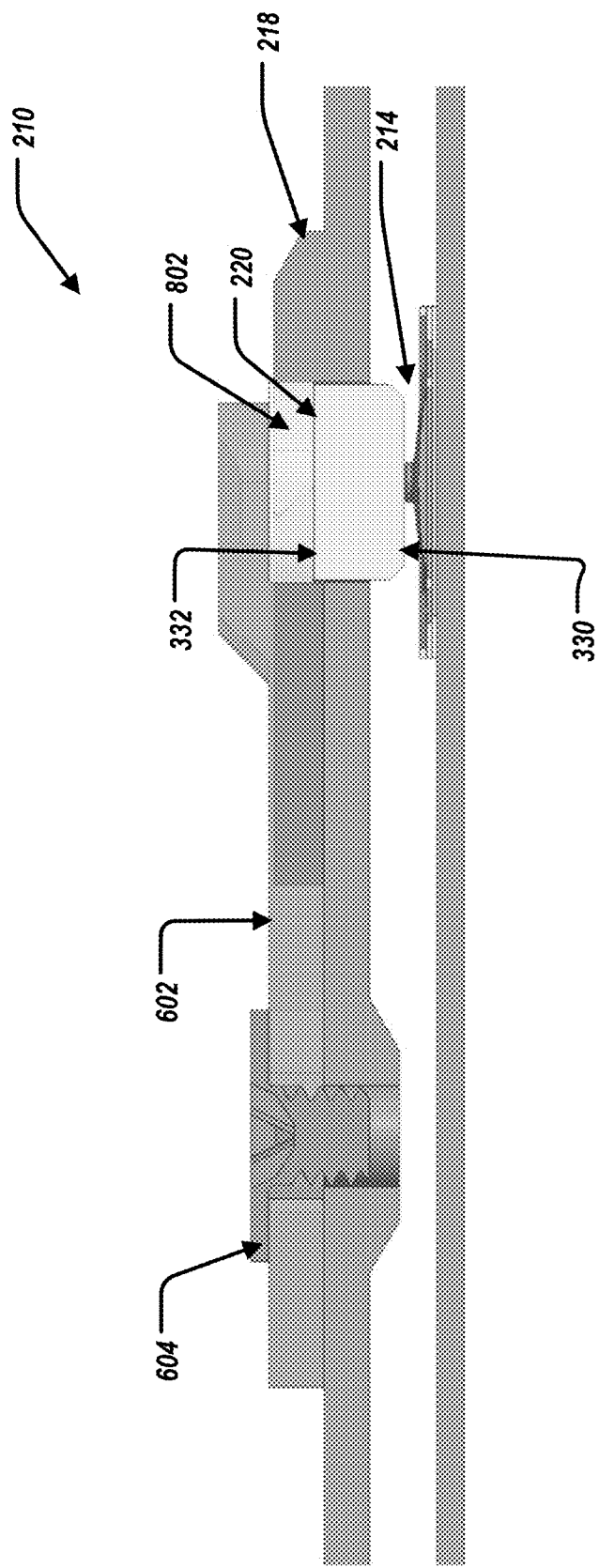
Figure 8C:
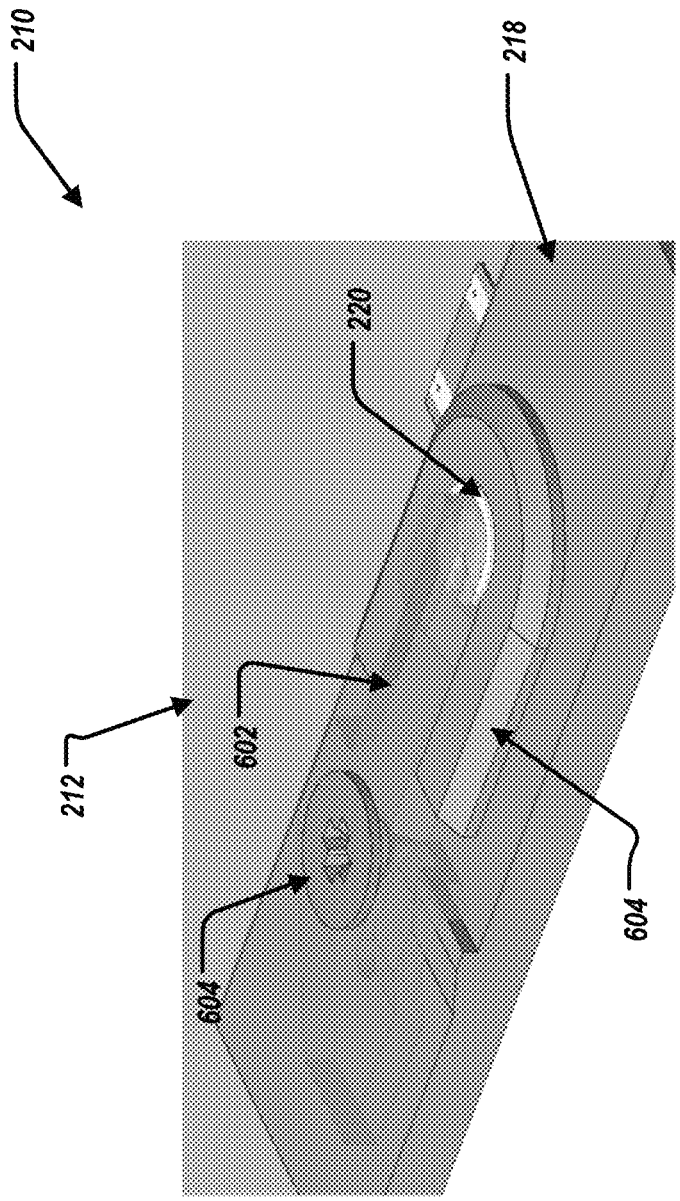

In some examples, the touchpad module 210 of FIGS. 6A-6C can further include an epoxy layer, as shown in FIGS. 8A-8C. Specifically, the touchpad module 210 can further include an epoxy layer 802 (similar to the epoxy layer 410 of FIGS. 4A-4D). The epoxy layer 802 can be positioned within the through hole 402 and adjacent to the second end 332 of the stopper 220, as shown in FIG. 8B. The epoxy layer 802 can facilitate maintaining a positioning of the stopper 220 within the through hole 402 and further, the positioning of the stopper 220 within the through hole 402 to be in contact with the switch 214. Specifically, the stopper 220 is positioned within the through hole 402 such that the first end 330 of the stopper 220 is in contact with the switch 214. The epoxy layer 802 can then be positioned within the through hole 402, contacting the second side 332 of the stopper 220, to maintain or "fix" the positioning of the stopper 220 within the through hole 402, and in particular, in contact with the switch 214, as shown in FIGS. 8B and 8C. An ultraviolet (UV) light can be applied to the epoxy layer 802 to cure the epoxy layer 802 to maintain or "fix" the positioning of the stopper 220 within the through hole 402, and in particular, in contact with the switch 214.

In some examples, the wedge screw 604 can be positioned through the wedge block 602 to couple the wedge block 602 to the frame 218.

In some examples, the wedge block 602 is transparent to facilitate transmission of the ultraviolet (UV) light.

Figure 7:
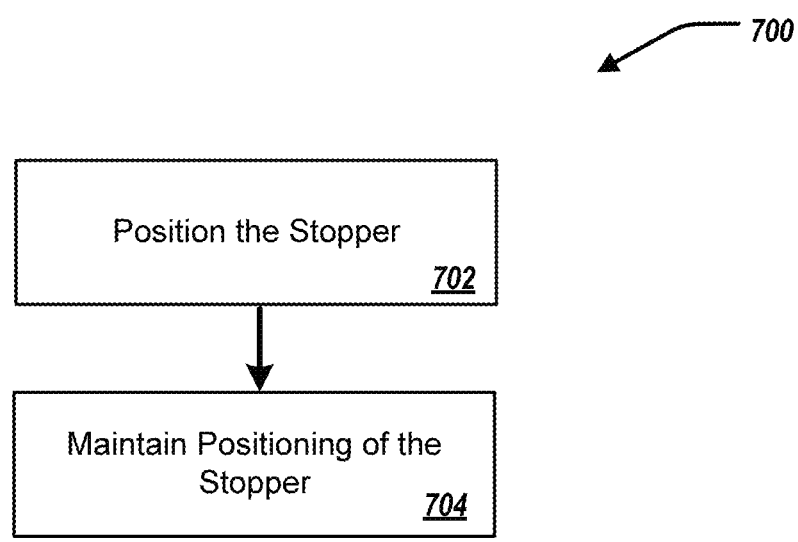
FIG. 7 illustrates a method for installing of the touchpad module.

FIG. 7 illustrates a flowchart depicting selected elements of an embodiment of a method 700 for installing the touchpad module 210. It is noted that certain operations described in method 700 may be optional or may be rearranged in different embodiments.

The stopper 220 is positioned within the through hole 402 of the segment 320 of the frame 218 (702). Specifically, the stopper 220 is positioned within the through hole 402 of the segment 320 of the frame 218 such that the first end 306 of the stopper 220 is in contact with the switch 214.

The positioning of the stopper 220 is maintained within the through hole 402 to be in contact with the switch 214 (704). For example, the epoxy layer 410 can maintain the positioning of the stopper 220 within the through hole 402, as described herein. For example, the spring member 502 can maintain the positioning of the stopper 220 within the through hole 402, as described herein. For example, the magnetic member 450 can maintain the positioning of the stopper 220 within the through hole 402, as described herein. For example, the wedge block 602 and the wedge screw 604 can maintain the positioning of the stopper 220 within the through hole 402, as described herein. For example, one or more of the epoxy layer 410, the spring member 502, the magnetic member 450, and the wedge block 602/wedge screw 604 can maintain the positioning of the stopper 220 within the through hole 402, as described herein.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touchpad module comprising:
   a touchpad printed circuit board (PCB);
   a switch coupled to a first side of the touchpad PCB;
   a wedge block;
   a wedge screw;
   a touchpad bracket, with at least a portion of the bracket spaced apart from the switch a first distance;
   a frame, with at least a segment of the frame positioned between the portion of the bracket and the switch, the segment of the frame including a through hole in superimposition with at least a portion of the switch; and
   a stopper positioned within the through hole and with a first end of the stopper in contact with the switch,
   wherein a first end of the wedge block is coupled to the stopper at a second end of the stopper opposite to the first end of the stopper,
   wherein the wedge screw is coupled to the frame and a second end of the wedge block to maintain a positioning of the wedge block with respect to the stopper, the second end of the wedge block opposite to the first end of the wedge block.

2. The touchpad module of claim 1, wherein the stopper is positioned within the through hole and with the first end of the stopper in contact with the switch such that there is a zero-gap between the switch and the first end of the stopper.

3. The touchpad module of claim 1, further comprising touchpad layer coupled to a second side of the touchpad PCB, the second side of the touchpad PCB opposite to the first side of the touchpad PCB.

4. The touchpad module of claim 1, further comprising an epoxy layer positioned within the through hole and adjacent to a second end of the stopper, the second end of the stopper opposite to the first end of the stopper, wherein the epoxy layer maintains a positioning of the stopper within the through hole to be in contact with the switch.

5. The touchpad module of claim 1, wherein the stopper is comprised of a magnetic material, the touchpad module further comprising a magnetic member, wherein the magnetic member maintains a position of the stopper within the through hole to be in contact with the switch.

6. The touchpad module of claim 1, further comprising a spring member, the spring member applying a force to a second end of the stopper, the second end of the stopper opposite to the first end of the stopper, wherein the spring maintains a position of the stopper within the through hole to be in contact with the switch.

7. An information handling system, comprising:
a processor;
memory media storing instructions executable by the processor to perform operations;
a touchpad module, including:
a touchpad printed circuit board (PCB);
a switch coupled to a first side of the touchpad PCB;
a wedge block;
a wedge screw;
a touchpad bracket, with at least a portion of the bracket spaced apart from the switch a first distance;
a frame, with at least a portion of the frame positioned between the portion of the bracket and the switch, the portion of the frame including a through hole in superimposition with at least a portion of the switch; and
a stopper positioned within the through hole and with a first end of the stopper in contact with the switch,
wherein a first end of the wedge block is coupled to the stopper at a second end of the stopper opposite to the first end of the stopper,
wherein the wedge screw is coupled to the frame and a second end of the wedge block to maintain a positioning of the wedge block with respect to the stopper, the second end of the wedge block opposite to the first end of the wedge block.

8. The information handling system of claim 7, wherein the stopper is positioned within the through hole and with the first end of the stopper in contact with the switch such that there is a zero-gap between the switch and the first end of the stopper.

9. The information handling system of claim 7, further comprising touchpad layer coupled to a second side of the touchpad PCB, the second side of the touchpad PCB opposite to the first side of the touchpad PCB.

10. The information handling system of claim 7, further comprising an epoxy layer positioned within the through hole and adjacent to a second end of the stopper, the second end of the stopper opposite to the first end of the stopper, wherein the epoxy layer maintains a positioning of the stopper within the through hole to be in contact with the switch.

11. The information handling system of claim 7, wherein the stopper is comprised of a magnetic material, the touchpad module further comprising a magnetic member, wherein the magnetic member maintains a position of the stopper within the through hole to be in contact with the switch.

12. The information handling system of claim 7, further comprising a spring member, the spring member applying a force to a second end of the stopper, the second end of the stopper opposite to the first end of the stopper, wherein the spring maintains a position of the stopper within the through hole to be in contact with the switch.

13. A method of mounting a stopper for a touchpad module, comprising:
positioning a stopper within a through hole of a segment of a frame that is positioned between a portion of a touchpad bracket and a switch, wherein the portion of the touchpad bracket is spaced apart from the switch a first distance, and the switch is coupled to a first side of a touchpad printed circuit board (PCB), wherein the stopper is positioned through the through hole of the segment of the frame such that a first end of the stopper is in contact with the switch, the through hole in superimposition with at least a portion of switch; and
maintaining a positioning of the stopper within the through hole to be in contact with the switch; and
maintaining a positioning of a wedge block with respect to the stopper by coupling a first end of the wedge block to the stopper at a second end of the stopper, opposite to the first end of the stopper, and coupling a wedge screw to the frame and a second end of the wedge block, the second end of the wedge block opposite to the first end of the wedge block.

14. The method of claim 13, wherein maintaining the positioning of the stopper within the through hole further comprises maintaining the positioning of the stopper within the through hole such that the first end of the stopper is in contact with the switch with a zero-gap between the switch and the first end of the stopper.

\* \* \* \* \*